(12) United States Patent
Chen et al.

(10) Patent No.: US 8,002,432 B2
(45) Date of Patent: Aug. 23, 2011

(54) DESK LAMP WITH A SEPARABLE MAGNIFIER

(75) Inventors: Yu-Gang Chen, Yongkang (TW); Cheng-Yu Liu, Yongkang (TW)

(73) Assignee: Far East University, Tainan (TW)

( * ) Notice: Subject to any disclaimer, the term of this patent is extended or adjusted under 35 U.S.C. 154(b) by 226 days.

(21) Appl. No.: 12/166,379

(22) Filed: Jul. 2, 2008

(65) Prior Publication Data

US 2009/0009891 A1  Jan. 8, 2009

(30) Foreign Application Priority Data

Jul. 4, 2007 (TW) ................................ 96124251 A

(51) Int. Cl.
*F21L 4/00* (2006.01)
*F21L 13/00* (2006.01)
*F21S 8/08* (2006.01)
*G02B 27/02* (2006.01)

(52) U.S. Cl. ........ 362/183; 362/190; 362/413; 359/802; 359/803

(58) Field of Classification Search .................. 362/183, 362/410, 413, 414, 190, 191; 359/802, 803
See application file for complete search history.

(56) References Cited

U.S. PATENT DOCUMENTS

| | | | | |
|---|---|---|---|---|
| 1,909,662 A * | 5/1933 | Conners | .......................... | 359/803 |
| 4,029,954 A * | 6/1977 | Moyer | ........................... | 362/183 |
| 4,506,317 A * | 3/1985 | Duddy | ........................... | 362/396 |
| 4,885,667 A * | 12/1989 | Selden | ........................... | 362/253 |
| 4,958,913 A * | 9/1990 | Schaffer | ........................ | 359/819 |
| 5,021,933 A * | 6/1991 | Cordes | ........................... | 362/109 |
| 5,091,834 A * | 2/1992 | Kao et al. | ....................... | 362/648 |
| 5,103,384 A * | 4/1992 | Drohan | .......................... | 362/191 |
| 5,276,596 A * | 1/1994 | Krenzel | ......................... | 362/191 |
| 5,461,551 A * | 10/1995 | Clayton | ......................... | 362/183 |
| 6,322,226 B1 * | 11/2001 | Dickson | .......................... | 362/33 |
| 6,663,266 B2 * | 12/2003 | Huang | ........................... | 362/402 |
| 6,903,882 B1 * | 6/2005 | Cameron et al. | ............... | 359/803 |
| 7,249,864 B2 * | 7/2007 | Smith et al. | .................... | 362/183 |
| 7,400,459 B2 * | 7/2008 | Welch | ............................ | 359/802 |
| 2002/0163807 A1 * | 11/2002 | Lee et al. | ....................... | 362/253 |
| 2006/0061991 A1 * | 3/2006 | Yeh | ................................ | 362/250 |

FOREIGN PATENT DOCUMENTS

TW  082218183  6/1995

* cited by examiner

*Primary Examiner* — David R Crowe
(74) *Attorney, Agent, or Firm* — Ming Chow; Sinorica, LLC

(57) ABSTRACT

This present invention discloses a desk lamp with a separable magnifier, which comprises a magnifier component and a desk lamp holder. Around the lens of the magnifier component, a plurality of illumination lamps is arranged for illumination. When the power storage module of the magnifier is exhausted, the handle of the magnifier can be inserted into the slot of the receptacle to charge. When the desk lamp is put into use, the magnifier component is combined with the receptacle as a desk lamp. The whole assembly is convenient.

3 Claims, 3 Drawing Sheets

DESK LAMP WITH A SEPARABLE MAGNIFIER

FIELD OF THE INVENTION

This present invention is related to a desk lamp with a separable magnifier which is constituted by a magnifier and a desk lamp. The desk lamp with a separable magnifier can be put into use for lighting or be dismantled of the magnifier for application. There are two types for supplying power comprising supplied through the desk lamp and charged by power storage module. As a result, it is really a product which provided efficiently industrial practicability.

BACKGROUND OF THE INVENTION

In prior art, an "annular working light attached with a magnifier" disclosed by the patent application of TW Pat NO. 82218183 is related to an annular working light attached with a magnifier, which is characterized in that an illumination device attached with a separable magnifier includes an annular light housing and two semi-circular clips. One of the semi-circular clips is combined with the magnifier in integrative shaping. The hollow of the annular light housing is used to accommodate the magnifier. According to the location of the annular light housing clamped by the two semi-circular clips, the magnifier can be fixed to the center of the annular light housing, or to the inclined higher position or lower position etc. Or, the magnifier can be dismantled of for operating individually. However, when this annular working light attached with the magnifier is dismantled of, the fixed elements have to be taken apart so as to have the magnifier separated. Besides, the power of this lighting equipment is supplied through wires, so that such equipment is not portable and convenient. The fluorescent tube is very electricity-consuming. Therefore, the equipment is not convenient and economic enough to fulfill most application.

In view of the said defects, the inventors think it's necessary and urgent to be improved, so they consider the ideas to improve their invention, and they always adhere to the concepts of excellent design to improve the existing defects with extensive design and exploration, and many times of correction. Finally, this present invention of the desk lamp with a separable magnifier appears. This design is full of practicability.

SUMMARY OF THE INVENTION

Therefore, it is one of objectives of the present invention is to provide a desk lamp with a separable magnifier to improve convenience and benefit in use of light device with a magnifier.

To achieve the above-mentioned objective, the present invention provides a desk lamp with a separable magnifier comprising a magnifier component and a desk lamp holder. The magnifier component comprises a frame body; a plurality of illumination lamps disposed around the frame body, wherein the illumination lamps illuminate downwardly; a lens disposed on the inner edge of the frame body; a handle disposed on the outer edge of the frame body; a power storage module disposed inside the handle, wherein the power storage module is used for storing power and supplying power to the illumination lamps; and a plurality of charge conductors arranged at the end of the handle. The desk lamp holder comprises a socket formed with a slot for detachably assembling the magnifier component with the socket of the desk lamp holder so as to align the magnifier component with the socket of the desk lamp holder, wherein the power storage module comprised in the magnifier component is charged automatically by inserting the magnifier component into the socket; the desk lamp holder further comprises a base, a first arm and a second arm; the first arm is connected to the base; the first arm is connected to the second arm by a first rotary shaft; the second arm is connected to the socket by a second rotary shaft; and a main direction of the magnifier component and the first arm is perpendicular.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENTS

Figure 1:
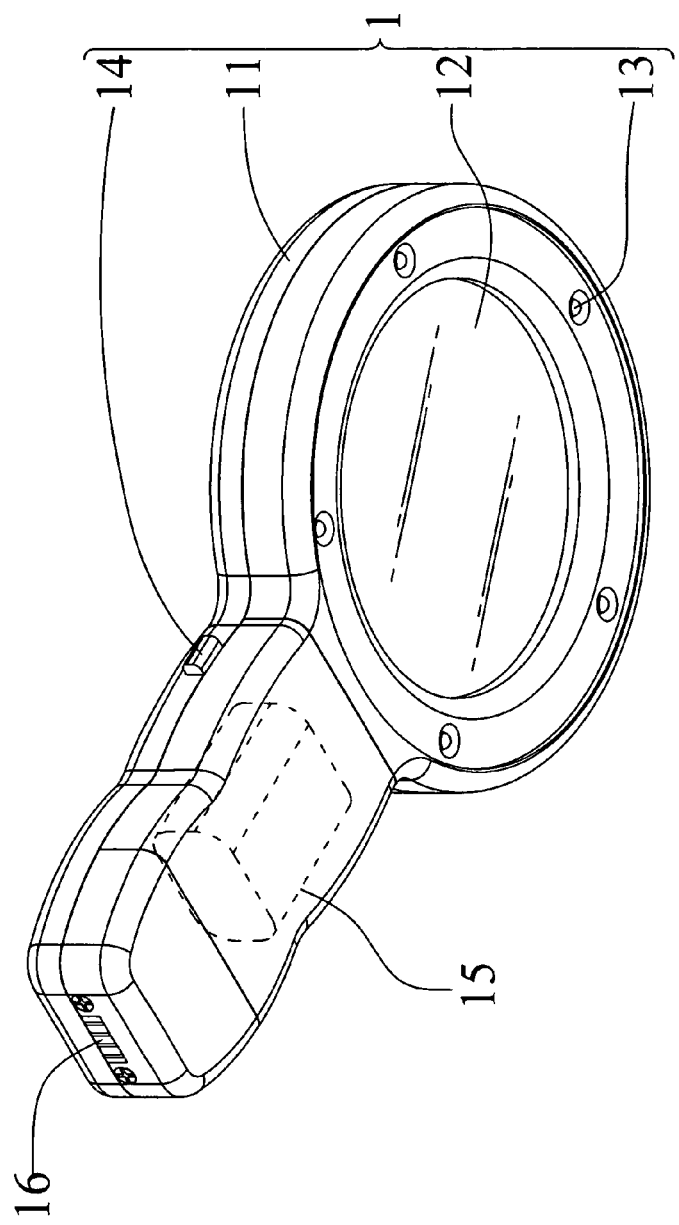
FIG. 1 is a schematic diagram of a magnifier component of this present invention.
Figure 2:
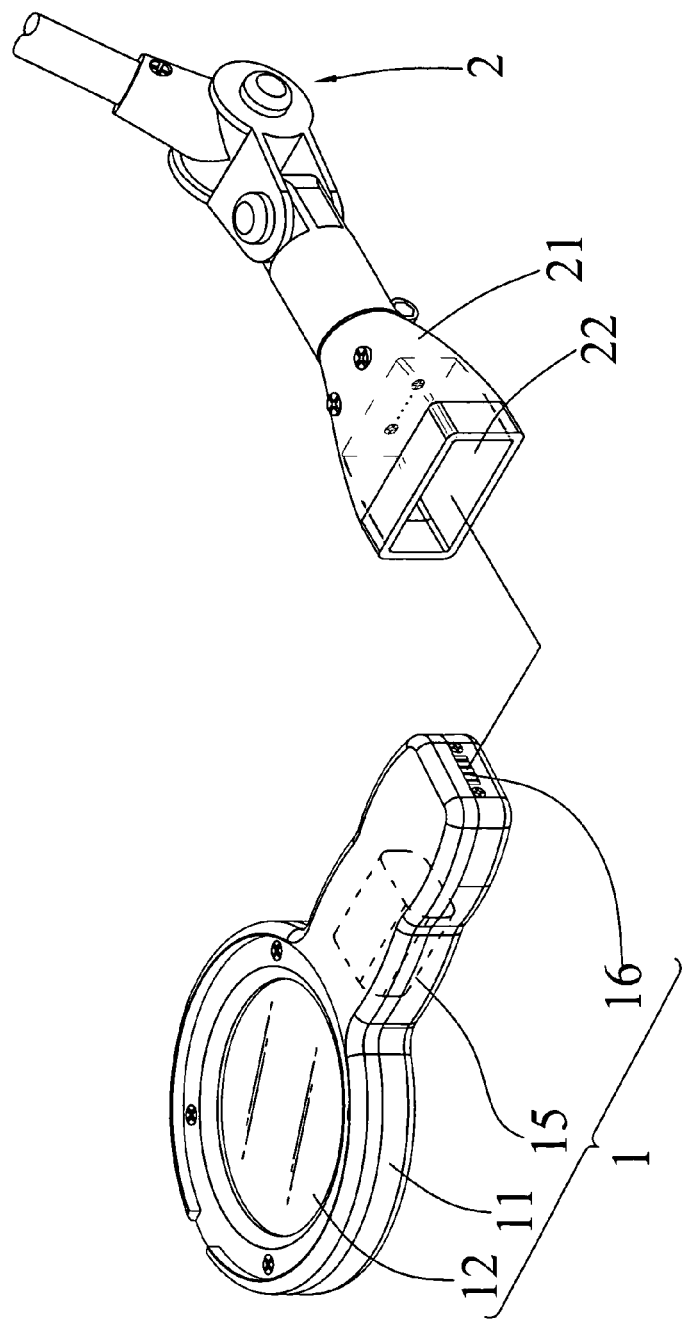
FIG. 2 is an assembling schematic diagram of this present invention.

Referring to FIG. 1 and FIG. 2 for a magnifier component and an assembling schematic diagram of this present invention, while the separable magnifier and desk lamp is assembled together, a lens 12 is disposed on the round frame body 11 of the magnifier component 1. A plurality of illumination lamps 13 are disposed around the frame of lens 12, and the illumination lamps 13 illuminate downwardly. A button switch 14 is installed at the external edge of the handle of the frame body 11. The button switch 14 is use for turning on or turning off the illumination lamps 13.

A power storage module 15 is disposed inside the handle of the frame body 11 for supplying power to illumination lamps 13. Preferably, the power storage module 15 can be a rechargeable module or a battery module. A plurality of charge conductors 16 are installed at the end of the handle of frame body 11. The desk lamp holder 2 comprises a socket 21 formed with a slot 22 for detachably assembling the magnifier component 1 with the socket 21 of the desk lamp holder 2 so as to align the magnifier component 1 with the socket 21 of the desk lamp holder 2, wherein the power storage module 15 comprises in the magnifier component is charged automatically by inserting the magnifier component 1 into the socket 21. The socket 21 provided with the slot 22 and the handle of the magnifier component 1 can be dismantled off and assembled repeatedly, so that the user can operate the magnifier component 1 more conveniently. Furthermore, when the handle is inserted into desk lamp holder 2, the power storage module 15 can be charged via charge conductors 16.

Figure 3:
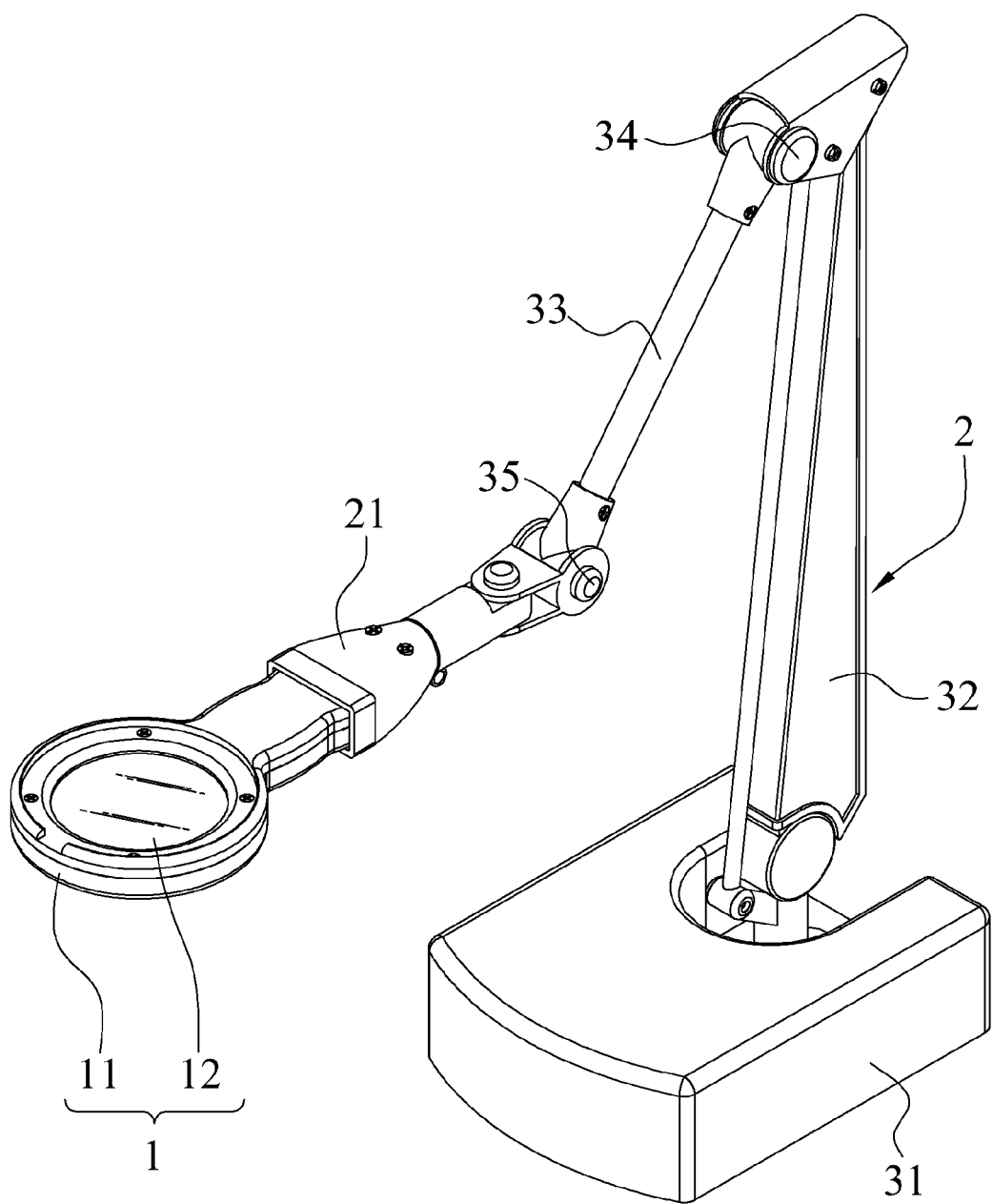
FIG. 3 is a schematic diagram of the embodiment of this present invention.

Referring to FIG. 1 and FIG. 3 for a schematic diagram of a magnifier component of this present invention and a schematic diagram of the embodiment of this present invention, when the user desires to use the magnifier component 1 individually, the user can dismantle of the magnifier component 1 from the slot 22 of the desk lamp holder 2. Around lens 12 of magnifier component 1, a plurality of illumination lamps 13 are installed for illumination. A button switch 14 is installed at the handle of the magnifier component 1 for efficiently controlling the illumination lamps 13. When the power storage module 15 of the magnifier component 1 is exhausted, the magnifier component 1 can be inserted into the socket 21 of the desk lamp holder 2 for charging. When the use desires to use the desk lamp, the user can just combine the magnifier component 1 and the socket 21 of the desk lamp holder 2, and then this equipment is regarded as desk lamp. Additionally, the desk lamp holder 2 further comprises a base 31, a first arm 32 and a second arm 33. The first arm 32 is connected to the base 31; the first arm 32 is connected to the second arm 33 by a first rotary shaft 34; and the second arm 33 is connected to the socket 21 by a second rotary shaft 35. A main direction of the magnifier component 1 and the first arm 32 is perpendicular.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A desk lamp with a separable magnifier comprising:
a magnifier component, comprising:
   a frame body;
   a plurality of illumination lamps disposed around the frame body, wherein the illumination lamps illuminate downwardly;
   a lens disposed on the inner edge of the frame body;
   a handle disposed on the outer edge of the frame body;
   a power storage module disposed inside the handle, wherein the power storage module is used for storing power and supplying power to the illumination lamps; and
   a plurality of charge conductors arranged at the end of the handle; and
a desk lamp holder comprising a socket formed with a slot for detachably assembling the magnifier component with the socket of the desk lamp holder so as to align the magnifier component with the socket of the desk lamp holder, wherein the power storage module comprised in the magnifier component is charged automatically by inserting the magnifier component into the socket; the desk lamp holder further comprises a base, a first arm and a second arm; the first arm is connected to the base; the first arm is connected to the second arm by a first rotary shaft; the second arm is connected to the socket by a second rotary shaft; and a main direction of the magnifier component and the first arm is perpendicular.

2. The desk lamp with a separable magnifier of claim 1, wherein the power storage module of the magnifier component is a rechargeable module.

3. The desk lamp with a separable magnifier of claim 1, wherein the handle of the magnifier component further comprises a button switch, and the button switch is used for turning on or turning off the illumination lamps.

* * * * *